United States Patent [19]

Warren

[11] Patent Number: 4,635,135
[45] Date of Patent: Jan. 6, 1987

[54] RECORDING BIAS METHOD AND CIRCUIT
[75] Inventor: Henry R. Warren, Belle Mead, N.J.
[73] Assignee: RCA Corporation, Princeton, N.J.
[21] Appl. No.: 268,916
[22] Filed: Jun. 1, 1981

Related U.S. Application Data

[63] Continuation of Ser. No. 88,563, Oct. 26, 1979, abandoned.
[51] Int. Cl.[4] .................. H04N 9/491; G11B 5/03
[52] U.S. Cl. ........................... 358/330; 360/66
[58] Field of Search .............. 360/66, 30; 358/4, 8
[56] References Cited

U.S. PATENT DOCUMENTS

| 2,892,017 | 6/1959 | Houghton | 358/4 |
| 3,234,323 | 2/1966 | Kihara | 358/4 |
| 3,368,032 | 2/1968 | Gooch et al. | 360/33 X |
| 3,482,038 | 12/1969 | Warren | 360/66 |
| 3,821,797 | 6/1974 | Suzuki et al. | 360/66 X |
| 3,982,272 | 9/1976 | Verhoeven et al. | |
| 4,134,126 | 1/1979 | Hirai | 358/4 |
| 4,165,518 | 8/1979 | Hirai | 358/8 |

Primary Examiner—Aristotelis M. Psitos
Attorney, Agent, or Firm—Eugene M. Whitacre; Paul J. Rasmussen; Joseph J. Laks

[57] ABSTRACT

A recording system has one signal FM recorded and another signal baseband recorded. The multiple of the FM carrier is used as bias for the baseband recording to eliminate beats.

10 Claims, 2 Drawing Figures

RECORDING BIAS METHOD AND CIRCUIT

This is a continuation of application Ser. No. 088,563, filed 10-26-79, now abandoned.

BACKGROUND OF THE INVENTION

The present invention relates to recording, and more particularly to methods and circuits for reducing beats.

In order to achieve a high dynamic range and good signal to noise ratio, it is known to separately record luminance and chrominance components of a composite video signal on adjacent tracks. The chroma signal is baseband recorded, which requires a bias signal for linearization, while the luminance signal is FM recorded, which does not require a bias. If a fixed frequency bias is used for the chroma recording, the bias signal will beat with the FM luminance signal during both recording (due to inductive coupling between recording heads) and playback (due to the chroma head picking up the recorded bias frequency and inductively coupling it to the luminance head). This will alter the phase of the FM luminance signal, causing variations in it across the display tube after demodulation. One possibility is to increase the bias frequency so that the chroma head will not pick up the bias signal during playback. This still leaves the beat generation problem during recording.

One way that has been tried to overcome this problem is to use the FM luminance carrier as the chroma signal recording bias. This eliminates the beating problem during recording since the bias and carrier have the same frequency. However, during playback the chroma head will pick up the bias signal and inductively couple it to the luminance head. Due to slight timing difference between the chroma and luminance tracks, the induced bias signal and the FM carrier reproduced from the luminance track will have phase differences causing phase shift in the FM carrier and thus distortion in the reproduced picture. To overcome his problem, it is known to make the chroma head gap longer so it will not pick up during playback the FM signal used as a bias signal. However, since the chroma and luminance heads are now different, manufacturing costs are higher, and they have a different phase response, which must be electrically compensated.

It is therefore desirable to have a recording system that eliminates beats during both record and playback operations without increasing complexity.

SUMMARY OF THE INVENTION

In brief, this is achieved by having a circuit that uses a multiple of the frequency modulated carrier as the recording bias for the chroma head.

DETAILED DESCRIPTION

Figure 1:
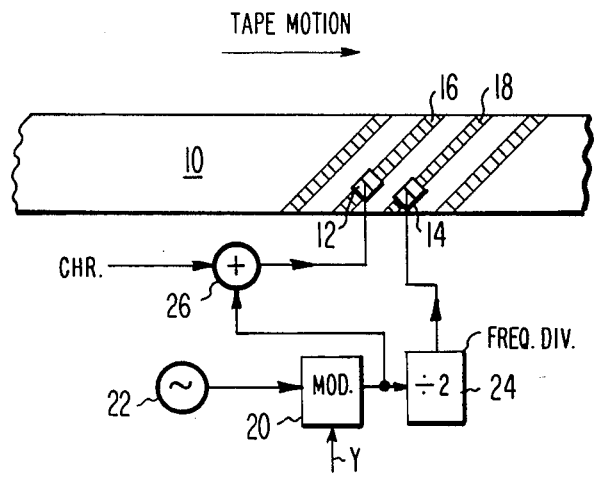
FIG. 1 is a block diagram of the preferred embodiment of the invention.

FIG. 1 shows a moving magnetic tape 10 and a pair of recording heads 12 and 14 for chrominance and luminance signals respectively in contact with the tape 10 so as to simultaneously record the signals in diagonal adjacent tracks 16 and 18 respectively. It will be appreciated that the drawing is symbolic in that the tape actually is helically wound about a drum (not shown) and the heads 12 and 14 are actually disposed in a rotating headwheel (not shown) within the drum, as is well known in the recording art.

Luminance signal component Y of a composite video signal is applied to a frequency modulator 20. An oscillator 22 generates a frequency of about 10 MHz. The resulting FM signal is frequency divided in two by frequency divider 24. The divided signal is applied to luminance recording head 14. This frequency division approach is used for obtaining better symmetry of the resulting FM signal that is applied to luminance recording head 14 than a frequency multiplication scheme described hereinafter. A chrominance signal derived from the same composite video signal as the luminance signal is applied to a linear adder 26, which also receives the signal from modulator 20 to act as a recording bias signal for linearization of the tape amplitude characteristic. The combined signals are applied to chrominance recording head 12.

It will be seen that there are no beats generated during recoding since the bias frequency changes with changes in the frequency of the FM luminance carrier keeping their frequency ratio constant. Since the bias frequency is high and hence has a short wavelength, there is no pickup of it by the chroma head 12 during playback, thus also reducing beats.

Figure 2:
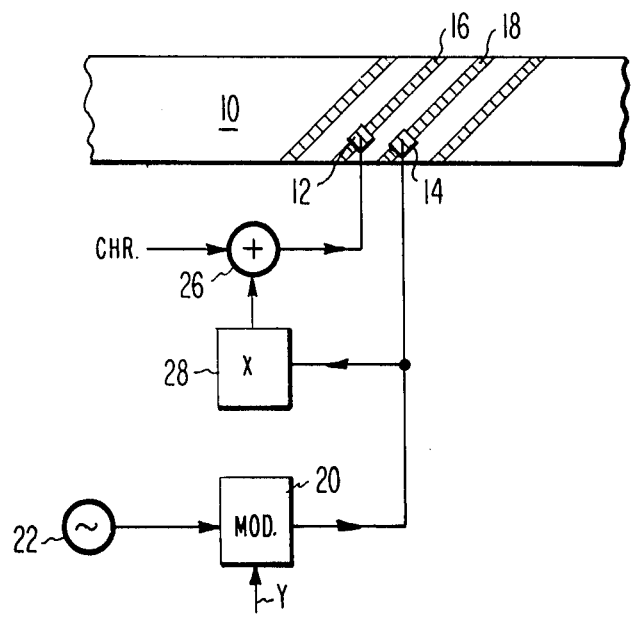
FIG. 2 is a block diagram of an alternate embodiment.

FIG. 2 shows an alternate embodiment of the invention where corresponding components have been given corresponding reference numerals. Here the modulated signal from modulator 20 is applied directly to head 14 and to a frequency multipler 28. This multiplier doubles the frequency of the modulated carrier and applies it to adder 26 to be used as recording bias. The operation is otherwise similar to FIG. 1.

Other embodiments of the invention will be obvious to those skilled in the art. For example, audio signals may be recorded on a track adjacent a track on which luminance is recorded. Also, three or more tracks may be used to record with FM-modulated luminance, chroma and audio information, with the middle track having one half the frequency of the other two.

What is claimed is:

1. A circuit for use with a carrier signal source and for recording first and second signals comprising:
a frequency modulator having first input means for receiving the first signal, a second input means for receiving the carrier signal, and an output means for providing a frequency modulated carrier; a first recording head for receiving a signal in accordance with said modulated carrier; deriving means coupled to said modulator output for deriving from said modulated carrier an alternating current recording bias signal having a frequency that is a multiple substantially greater than one of the instantaneous frequency of the signal applied to said first recording head; an adder having a first input means for receiving the second signal, a second input means coupled to said deriving means for receiving said alternating current recording bias signal, and an output, and a second recording head coupled to said adder output for direct simultaneous recording with said first head.

2. A circuit as claimed in claim 1, wherein said deriving means comprises a connection between said modulator output and said adder second input, and a frequency divider having an input coupled to said modulator output and an output coupled to said first recording head.

3. A circuit as claimed in claim 2, wherein said divider divides by two.

4. A circuit as claimed in claim 1, wherein said multiple comprises an integer multiple.

5. A circuit as claimed in claim 4, wherein said multiple equals two.

6. A circuit as claimed in claim 1, wherein said first and second signals comprise luminance and chrominance signals respectively.

7. A circuit as claimed in claim 1, wherein said deriving means comprises a connection between said modulator output and said first recording head, and a frequency multiplier having an input coupled to said modulator output and an output coupled to said adder second input.

8. A method of recording comprising applying a frequency modulated signal having an instantaneous frequency to a first recording head, and applying an alternating current recording bias signal derived from said frequency modulated signal and having a frequency that is a multiple substantially greater than one of said instantaneous frequency to a second recording head for direct simultaneous recording with said first head.

9. A method as claimed in claim 8, wherein said applying step comprises using a bias signal having a multiple which comprises an integer multiple.

10. A method as claimed in claim 9, wherein said applying step comprises using a bias signal having a multiple which is two.

* * * * *